United States Patent [19]

Mannig et al.

[11] Patent Number: 4,913,826

[45] Date of Patent: Apr. 3, 1990

[54] FAT, OIL AND GREASE FLOTATION TREATMENT OF POULTRY AND FOOD INDUSTRY WASTE WATER UTILIZING HYDROGEN PEROXIDE

[75] Inventors: Det Mannig, Allendale; Gerd Scherer, Montvale, both of N.J.

[73] Assignee: Degussa Aktiengesellschaft, Frankfurt, Fed. Rep. of Germany

[21] Appl. No.: 363,363

[22] Filed: Jun. 2, 1989

Related U.S. Application Data

[63] Continuation of Ser. No. 141,814, Jan. 11, 1988, abandoned.

[51] Int. Cl.$^4$ .............................................. C02F 1/24
[52] U.S. Cl. ..................................... 210/707; 210/759
[58] Field of Search ................................ 210/703–707, 210/708, 759

[56] References Cited

U.S. PATENT DOCUMENTS 4,555,345 11/1985 Yoshida .............................. 210/705
4,559,146 12/1985 Roets ................................. 210/705

Primary Examiner—Tom Wyse
Attorney, Agent, or Firm—Beveridge, DeGrandi & Weilacher

[57] ABSTRACT

Treatment of poultry processing plant waste water in dissolved air flotation unit and/or grease trap with hydrogen peroxide.

4 Claims, 4 Drawing Sheets

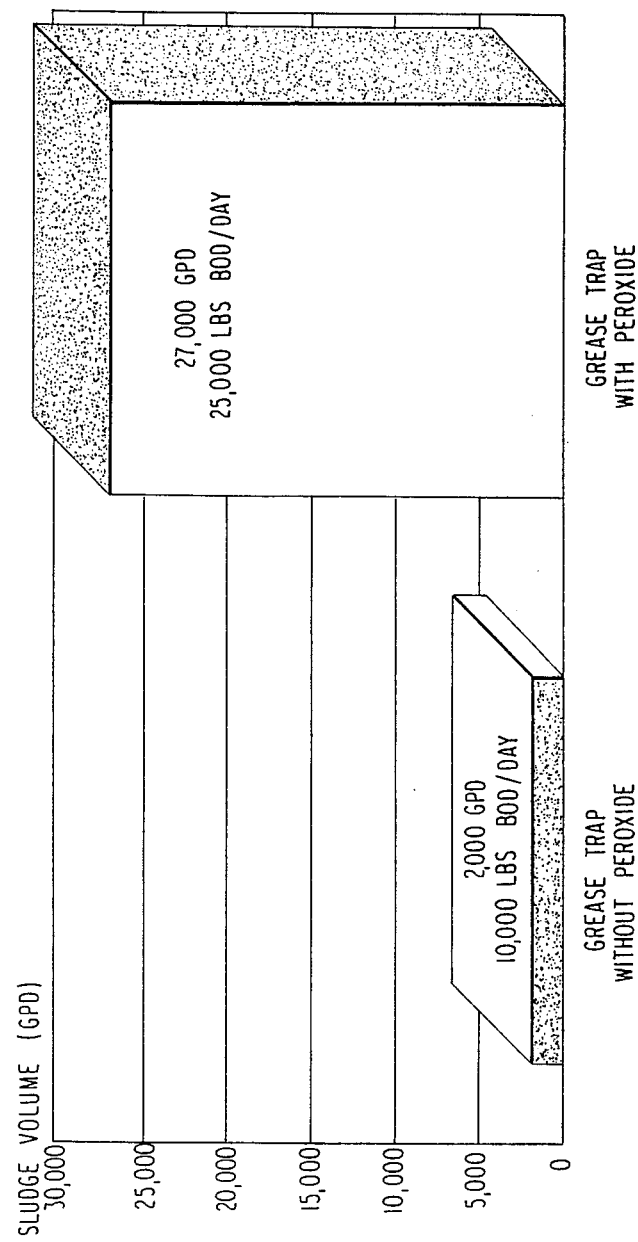

FAT, OIL AND GREASE FLOTATION TREATMENT OF POULTRY AND FOOD INDUSTRY WASTE WATER UTILIZING HYDROGEN PEROXIDE

The application is a continuation of application Ser. No. 141,814, filed Jan. 11, 1988, now abandoned.

INTRODUCTION AND BACKGROUND

The present invention relates to the treatment of waste water discharged from food industry plants, especially poultry processing installations, by contacting the waste water with a source of hydrogen peroxide.

The environmental demands placed on today's food processing facilities, and particularly the poultry industry require new solutions if producers are going to meet market demand without prohibitive cost increases. Municipal wastewater standards are constantly becoming more restrictive as are water usage limitations. The needs for the industry are clear; namely, use less water, use the water more efficiently and purify it to a greater degree while at the same time controlling odor, solids, and oxygen demand before discharge into a publicly operated treatment facility or into the environment.

Over the years, the poultry industry in particular has taken major strides toward reducing the consumption of water by drastically reducing the amount of water used to process food products.

A direct consequence of this conservation effort, however, has been a marked increase in the difficulty of producing a "quality effluent", a term which is used to refer to the wastewater discharge that meets Federal and local environmental permit guidelines.

As a result, food and poultry processing facilities in all but the most rural areas (where more resources are available) are facing dramatic increases in the costs associated with processing the waste water and meeting the environmental standards. These increases are either in the form of heavy capital expenditures to upgrade existing wastewater treatment systems, or in the form of payment of significant fees to municipalities for treating wastewater which does not meet prescribed guidelines.

It is therefore, an object of the present invention to provide a method for treatment of the waste water from food processing facilities and especially the poultry industry, to enable these installations to meet their environmental standards.

SUMMARY OF THE INVENTION

Hydrogen peroxide is a powerful oxidizing and disinfecting agent that finds a host of uses in many industries, including paper/pulp and textile bleaching, chemical synthesis, detergent and cleanser formulations and a broad range of environmental applications. A feature of the present invention resides in developing an effective and efficient method to solve problems in treatment of waste water from food and poultry processing plants. Among the advantages of the present invention is the fact that hydrogen peroxide is an environmentally beneficial chemical and therefore, helps to reverse the negative effects of traditional chemical products used in similar applications.

BRIEF DESCRIPTION OF DRAWINGS

The invention is further described with reference to the drawings, wherein:

FIG. 4 is a bar graph showing the removal of sludge in Example 2 when operating in accordance with the invention.

DETAILED DESCRIPTION OF INVENTION

Figure 1:
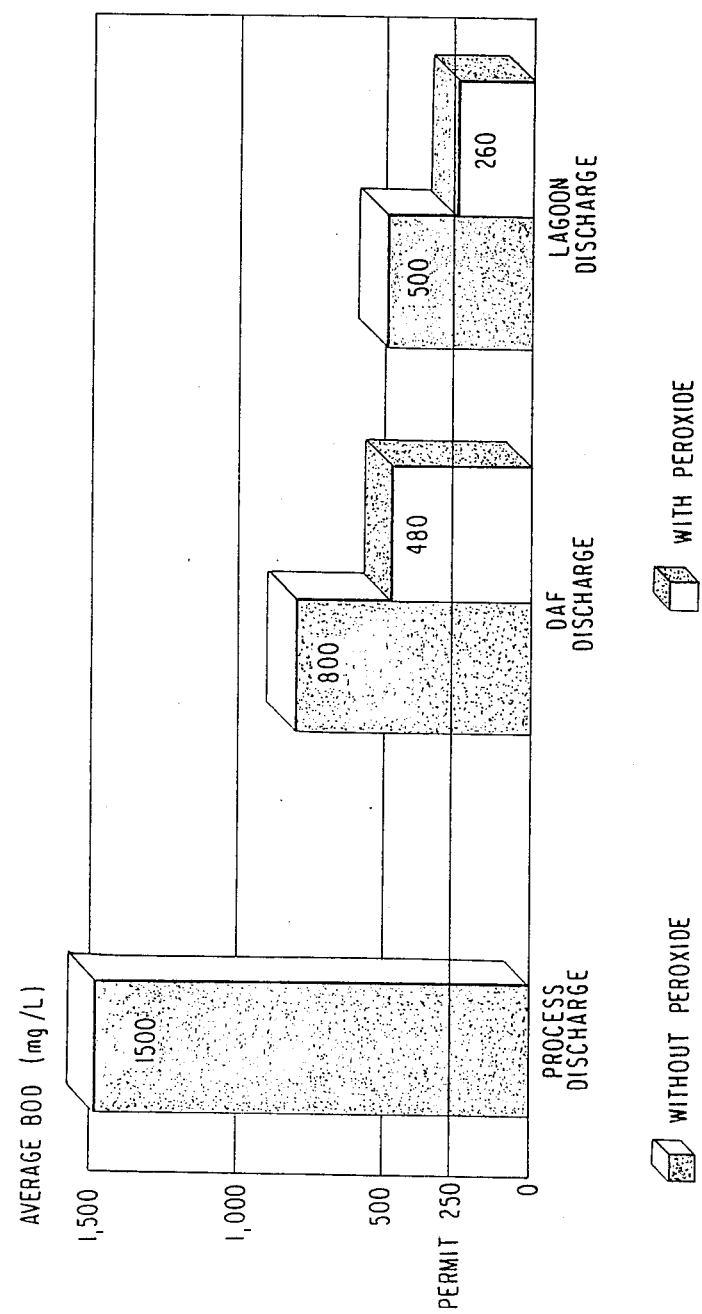
FIG. 1 is a bar graph showing the reduction in BOD in Example 1 when operating in accordance with the invention.

Virtually all of the United States' poultry processing facilities utilize a grease trap and/or a dissolved air flotation cell to remove fat, oil, and grease from the process water which is discharged into municipal wastewater treatment systems or into surface water. With a trend in the industry to decrease the amount of water being used per processed bird, the amount of fat, oil, and grease in the discharge water has, and will continue, to increase. Treatment systems will then become overloaded-resulting in effluents which surpass permit levels in BOD, COD, suspended solids and other parameters. As a result, poultry processing facilities are facing higher operations costs in the future associated with increased chemicals usage and regulatory surcharges.

Hydrogen peroxide can be utilized to enhance environmental systems performance--improving effluent quality, reducing surcharges and offering processing plants the ability to achieve their environmental goals while avoiding the need for expensive expansions of their environmental systems. Further, using hydrogen peroxide in these applications can lead to overall savings well beyond the cost of the chemicals.

In accordance with the present invention, applicants have provided a method for treating waste water effluent from poultry processing plants with a source of hydrogen peroxide ($H_2O_2$).

The process can be carried out using either a conventional dissolved air flotation cell or a so called "grease trap." Commonly used in the food industry, sewage treatment industry and elsewhere, dissolved air flotation cells are widely known. Additives such as flocculation agents, activators, as well as other agents used in such equipment are well known and understood. For a general description thereof, see, for example Kirk-Othmer: Encyclopedia of Chemical Technology 3rd Edition. Vol. 10, pp 523-547 and the Supplemental Volume pp 310-335, all of which is relied on herein.

When using dissolved air flotation equipment, an initial injection of about 30 parts per million (ppm) of $H_2O_2$ is introduced to react with any accumulated sediment, dirt build up and the like. After a few hours, the dosage rate can be cut back to about 15 to 20 ppm for optimum functioning of the system.

As is known in the art, a "grease trap" is a large basin type equipment fitted with a skimmer device for skimming of accumulated oil and grease. When using this type of equipment, an initial dosage rate of 150 ppm $H_2O_2$ is used and when the dirt build-up is removed, generally after a few hours, the dosage can be adjusted to about 40-70 ppm.

The $H_2O_2$ is usually in the form of an aqueous solution, typically 35% or 50% $H_2O_2$ in water. The concentration can of course vary as may be convenient and could be for example 20–70%, preferably 35–50%. Any convenient source of $H_2O_2$ can be used including components that release or generate $H_2O_2$ in situ.

The following examples serve to further illustrate the invention.

EXAMPLE 1

In the first example, a mid-Atlantic facility, processing 180,000 birds per day produced an average 600,000 gallons of wastewater per day. After treatment in a dissolved air flotation cell, this effluent was discharged into an anaerobic lagoon, and eventually into a municipal wastewater treatment facility.

In accordance with the invention, hydrogen peroxide was dosed in at the dissolved air flotation cell (DAF). The unit was thus able to flotate additional fat and grease to be picked up by surface skimmers. In effect, the addition of hydrogen peroxide to the process increased the amount of gas available to flotate fat. Hydrogen peroxide offers extremely fine, evenly dispersed oxygen bubbles when introduced into a DAF-cell. In fact, the oxygen available from the chemical decomposition of hydrogen peroxide is physically much more effective as a flotation agent than is compressed air.

By following the process of this invention, plant effluent improved dramatically. FIG. 1 shows the impact of various treatment schemes on plant effluent. Treatment with hydrogen peroxide increased BOD removal by 40% in the DAF-cell effluent and by nearly 50% in the final effluent. This plant was brought essentially to its BOD permit level (250 mg/L).

Figure 2:
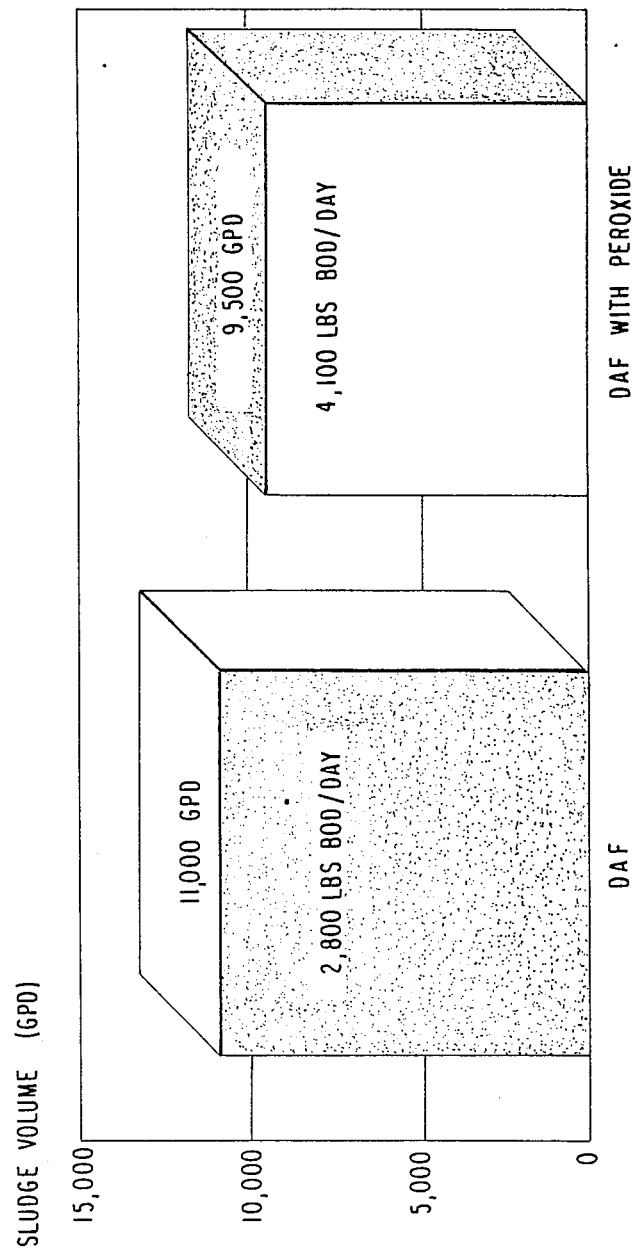
FIG. 2 is a bar graph showing the reduction in sludge in Example 1 when operating in accordance with the invention.

Sludge volume at this facility (FIG. 2) decreased by 15% after treatment with hydrogen peroxide, exhibited a higher dry matter, and BOD removal was increased by 45%. The details of this first example as set forth below:

A chicken processing plant which kills 180,000 birds per day (16 h) has to treat 600,000 gal wastewater. The existing system (d.a.f. cell) lowered the BOD from the process (1500 mg/l) to 800 mg/l. With the use of $H_2O_2$ the performance of the d.a.f. cell was increased. The BOD of the d.a.f. cell discharge was lowered to 500 mg/l. The lagoon discharge dropped after a certain period of time down to 260 mg/l BOD. Also, the ammonia ($NH_3$) and hydrogen sulfide ($H_2S$) contained in the lagoon discharge decreased significantly. The sludge volume was reduced from 11,000 gpd to 9,500 gpd, but the pounds of BOD removed per day increased from 2,800 to 4,100. In addition, the dry matter substance of the sludge increased from 12% to 20%.

An added benefit of peroxide treatment in this example was seen in the lagoon discharge as the reduction of oxygen-consuming hydrogen sulfide from 12 ppm to 5 ppm, and the reduction of discharged ammonia from 105 ppm to 65 ppm. An overall reduction in flocculants and polymers, required to assist the grease trap, reduced the total cost of treatment see the table below.

EXAMPLE 2

In the second example the work is conducted at a large southern poultry processing facility, similar dramatic improvements in effluent quality were achieved by utilizing hydrogen peroxide in conjunction with a grease trap.

In effect, the dispersion of oxygen through the decomposition of $H_2O_2$ in the grease trap turned the system into a flotation cell, without the capital cost associated with the installation of a less efficient compressed air system.

Figure 3:
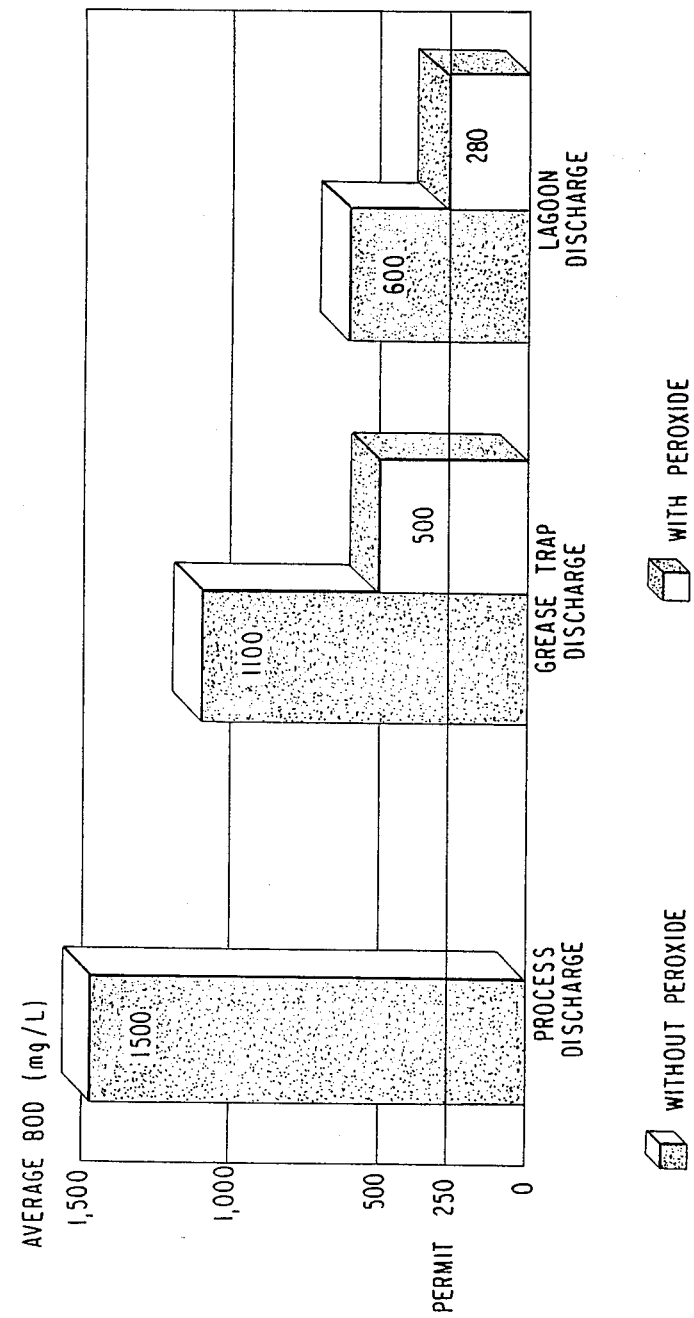
FIG. 3 is a bar graph showing the reduction in BOD in Example 2 when operating in accordance with the invention.

FIG. 3 shows improved results with the addition of hydrogen peroxide. BOD removal in the grease trap effluent was more than doubled and the BOD in the final effluent discharged to the municipal treatment system was more than cut in half.

FIG. 4 shows the improvement of the grease trap in removing fat from the process effluent. Increased flotation of fat resulted in a 13-fold increase in sludge, considerably reducing the burden on the anaerobic lagoon.

A very large chicken processing plant where the treatment system consists of grease trap (g.t.) and anaerobic lagoon before discharging into a publicly operated treatment works (POTW). The 1,500 mg BOD/l from the processing plant was lowered to 1,100 mg/l by the action of the g.t. The corresponding lagoon discharge was 600 mg BOD/l. The g.t. removed 2,000 gpd oil and grease from the wastewater which corresponds to 10,000 pounds of BOD removed per day. With the use of hydrogen peroxide, which converts the g.t. to a flotation cell, the BOD after the g.t. was lowered to 500 mg/l and the lagoon discharge dropped to 280 mg/l.

In facilities such as described in the examples, the use of hydrogen peroxide may assist in providing a significant reduction in the cost of operating the entire environmental system by enhancing the recovery of fat, oil and grease in the grease trap.

TABLE

Additional benefits after three weeks $H_2O_2$ in use:

| Chemicals added to d.a.f. cell | without $H_2O_2$ | with $H_2O_2$ |
|---|---|---|
| Flocculant | 240 ppm | 210 ppm |
| Polymer | 7 ppm | 4 ppm |
| Lagoon discharge | | |
| Ammonia ($NH_3$) | 105 ppm | 65 ppm |
| $H_2S$ | 12 ppm | 5 ppm |

Further variations and modifications of the present invention will be apparent to those skilled in the art from the foregoing and are intended to be encompassed by the appended claims.

We claim:

1. A process for treating waste water from a food processing plant consisting essentially of introducing an effective amount up to 150 ppm of a source of hydrogen peroxide into the waste water discharge from a food processing plant which contains fat, oil or grease, or mixtures thereof, contacting said waste water with said hydrogen peroxide to create a flotation effect through hydrogen peroxide decomposition to fine oxygen bubbles and water and removing said fat, oil or grease or mixtures thereof by flotation means.

2. The processing according to claim 1 wherein said waste water is in a dissolved air flotation unit and the hydrogen peroxide is injected therein in a dosage sufficient to react with any accumulated sediment or dirt buildup.

3. The process according to claim 2 wherein the hydrogen peroxide is initially injected in the amount of 30 ppm and subsequently, charged at the rate of 15–20 ppm.

4. The process according to claim 1 wherein the waste water is conveyed to a basin and the hydrogen peroxide is used in an initial amount of 150 ppm and subsequently charged at the rate of 40–70 ppm.

* * * * *